Patented Aug. 18, 1925.

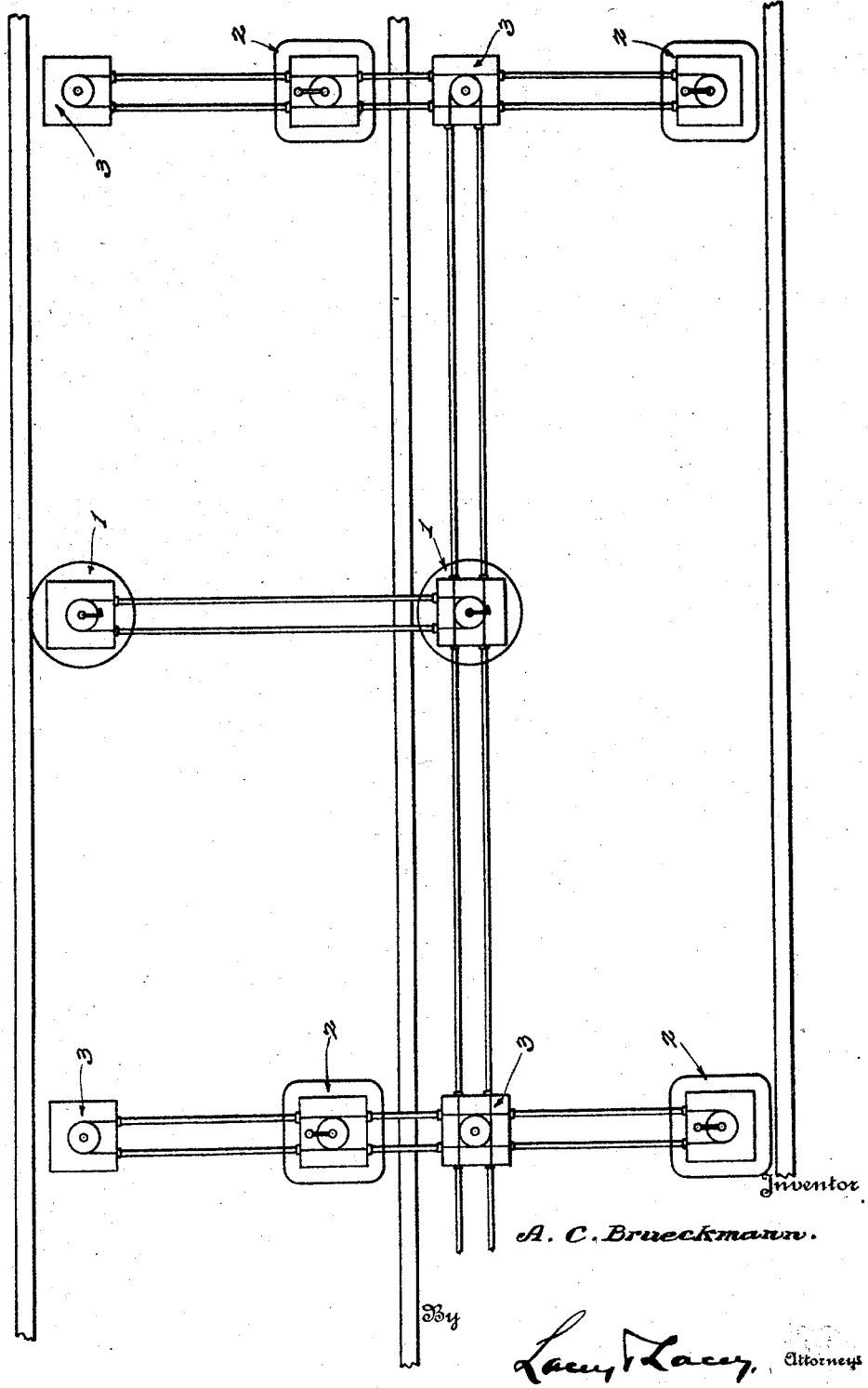

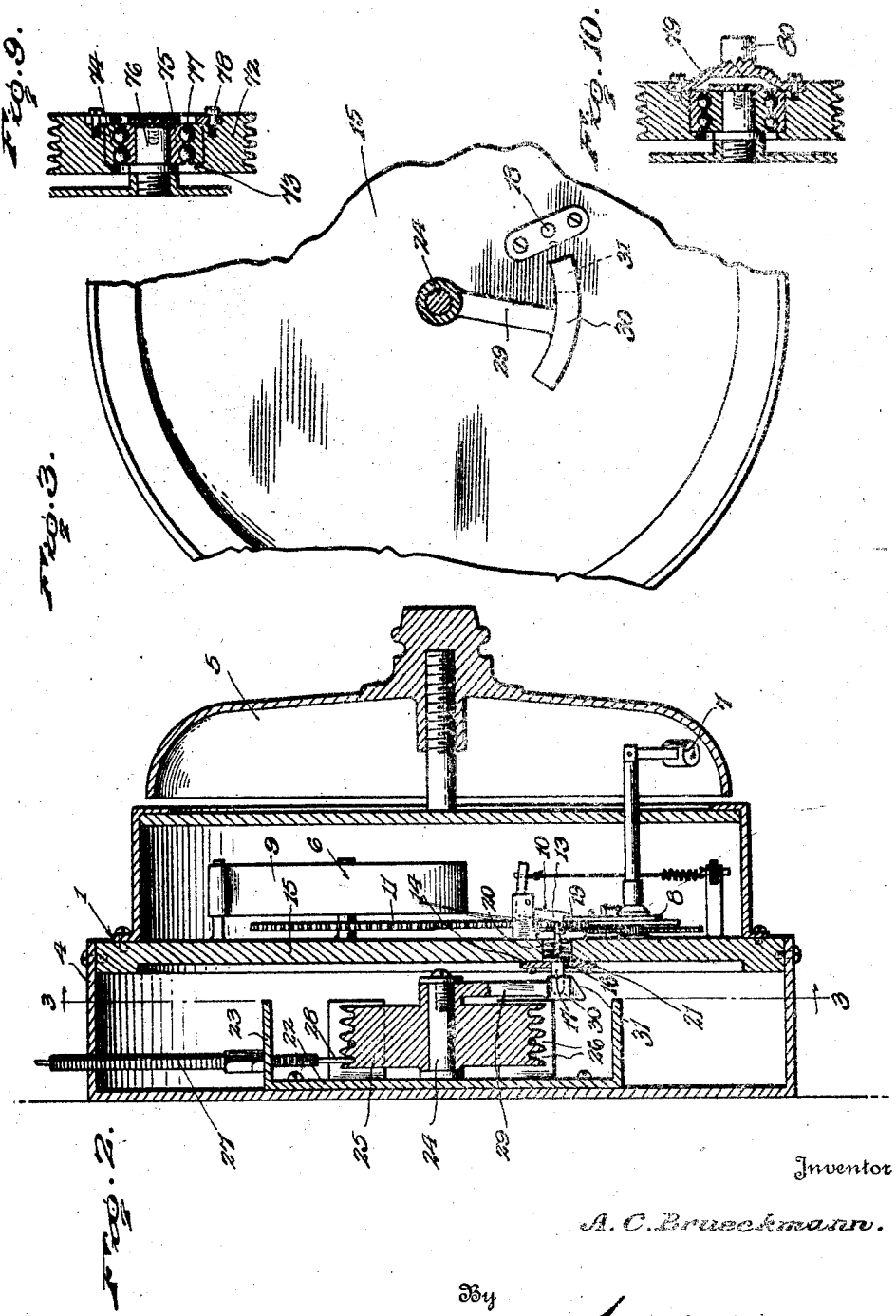

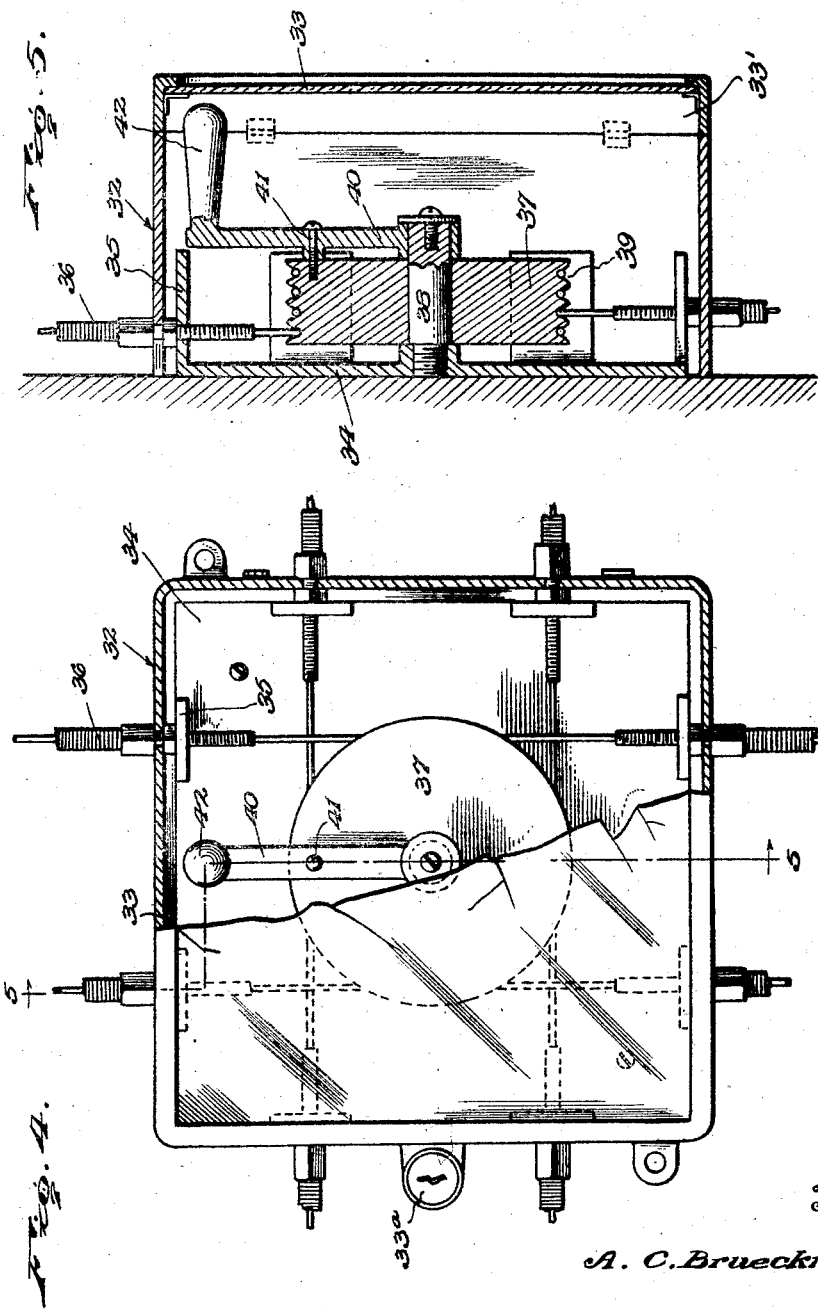

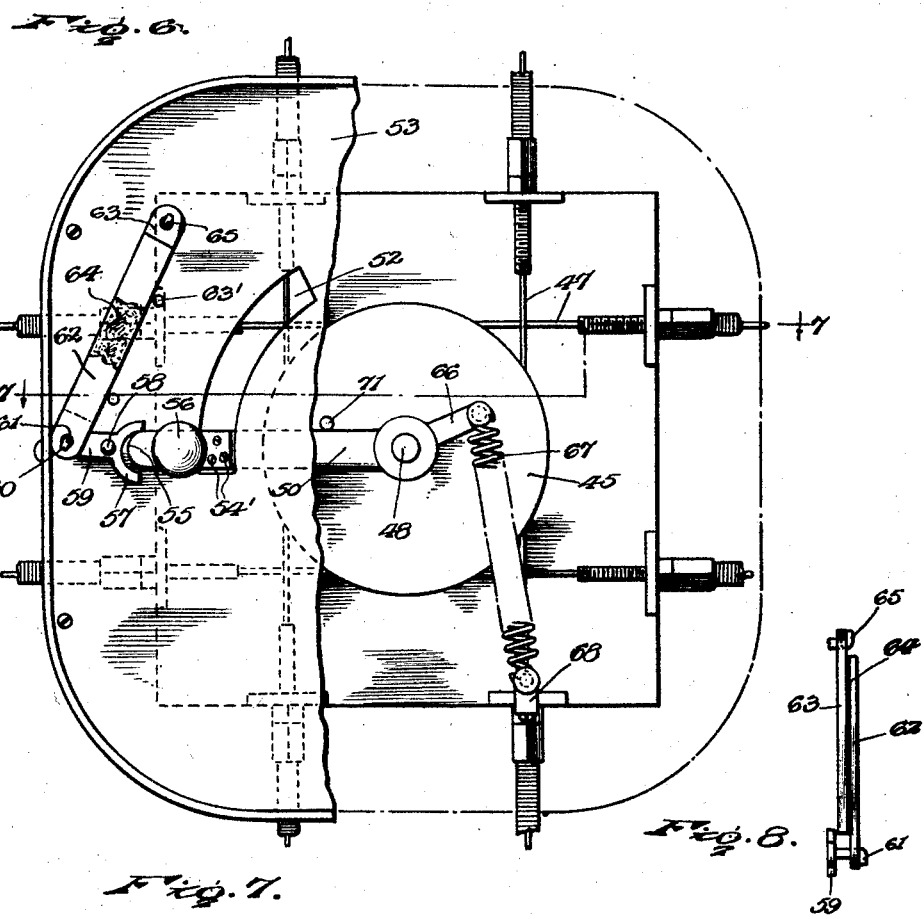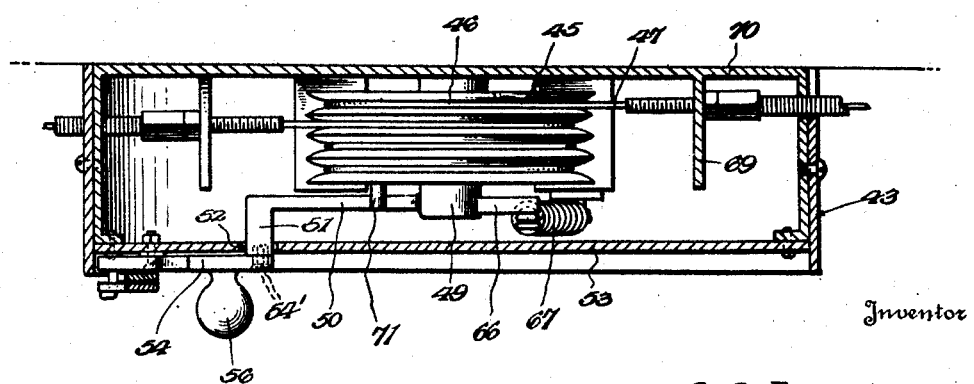

1,549,902

UNITED STATES PATENT OFFICE.

ADOLPH C. BRUECKMANN, OF BALTIMORE, MARYLAND.

MECHANICAL CONTROL SYSTEM.

Application filed November 22, 1923. Serial No. 676,445.

*To all whom it may concern:*

Be it known that I, ADOLPH C. BRUECKMANN, a citizen of the United States, residing at Baltimore, and State of Maryland, have invented certain new and useful Improvements in Mechanical Control Systems, of which the following is a specification.

This invention, relates to an improved mechanically controlled alarm system.

In schools, hospitals, public buildings, factories, and other structures which are ordinarily of considerable size, it is customary to install fire alarm systems. Practically the universal system adopted is the electrical system. However, such a system is expensive to install and maintain and its efficiency, in cases of emergency, depends on the condition of the wiring and the more or less delicate mechanisms which are embodied in the system, so that if the system has not been properly installed or if the wiring has become disarranged, or the circuit closing devices are not in condition for proper functioning, the system is useless in the emergency. It has been proposed to employ compressed air as a medium for tripping the alarm mechanism of such a system, thereby obviating electrical wiring and the installation of complicated electrical devices, but this type of control is likewise open to objection for the reason that it is expensive to install and there is considerable expense attached to the maintenance of a source of compressed air supply. A properly designed mechanical control would overcome the disadvantages attending the use of the electrical and compressed air systems, but so far as I am aware no practical mechanical control has, prior to my invention, been devised or employed. It is therefore the primary object of the present invention to provide a mechanical control which, while capable of application to many different uses and employment under many different conditions, is especially designed for use in a fire or other alarm system in building structures such as referred to above.

Another object of the invention is to provide a mechanical control which may be readily operated from different points in the building structure within which the alarm system in installed and which will be positive in its operation and inexpensive to install and which will furthermore require no expense for its upkeep.

Another object of the invention is to provide devices whereby the alarm will be sounded automatically in the event of fire in the vicinity of any one of a number of thermostatic controls, the alarm being, at the same time, adapted to be sounded by the operation of other manually operable controls so that if a fire is discovered before it has gained any considerable headway, the alarm system may be put in operation manually or, if the fire is not discovered until it has gained considerable headway, the thermostatic control will be automatically set in operation to sound the alarm.

In the accompanying drawings:

Figure 1 is a diagrammatic view illustrating in a general way one embodiment of the invention;

Figure 2 is a vertical sectional view in detail through the gong mechanism of the invention;

Figure 3 is a vertical sectional view taken substantially on the line 3—3 of Figure 2 looking in the direction indicated by the arrows;

Figure 4 is a front elevation of one of the manually operable controls;

Figure 5 is a vertical sectional view taken substantially on the line 5—5 of Figure 4 and looking in the direction indicated by the arrows;

Figure 6 is a view in elevation of one of the thermostatic controls;

Figure 7 is a sectional view on the line 7—7 of Figure 6 looking in the direction indicated by the arrows;

Figure 8 is a detail side elevation of the fusible link of the thermostatic control.

Figure 9 is a vertical sectional view illustrating the manner of mounting the pulleys which may be required to be employed where turns are made about corners and in other places;

Figure 10 is a similar view illustrating the adaptation of the improved form of pulley to the various controls.

Generally speaking, the invention comprises mechanically operated alarm mechanism, a desired number of manually operable controls which may be arranged at various points in the building in which the system is installed, and a desired number of thermostatically operated controls which may likewise be arranged at different suitable points in the building, mechanical connection being established between the several controls and the alarm mechanism for actuating the latter upon operation of any one of the controls. As before stated, the control system embodying the invention is not restricted to any specific use but may be employed wherever such a system is required. Likewise it is not absolutely essential that the thermostatic control devices be employed inasmuch as they are in themselves required only in case the control system is employed in connection with a fire alarm. Therefore, what is illustrated in the drawings and hereinafter specifically described is to be considered only as an example of one embodiment of the invention and it will be evident that the system might be rearranged, certain of the units omitted or other units added without departing from the spirit of the invention.

In Figure 1 of the drawings which illustrates diagrammatically one arrangement of the system embodying the invention, the alarm units are indicated by the numeral 1, the manually operable control units are indicated by the numeral 2, and the thermostatic control units are indicated by the numeral 3. One of the alarm units is illustrated in detail in Figures 2 and 3 of the drawings and the same comprises a casing 4 upon the front of which is supported a gong indicated by the numeral 5, the gong being of any required size and construction and being adapted to be sounded by a mechanical striking mechanism indicated in general by the numeral 6. The mechanism 6 constitutes no part of the present invention and is therefore illustrated in a conventional manner, it being understood that practically any of a number of mechanically operating striking mechanisms might be employed in connection with the gong. The striker of the striking mechanism is indicated by the numeral 7, and the numeral 8 indicates an element of the striking mechanism which, when held stationary, will restrain the mechanism from operation, it being understood that when this element is released, the mechanism will operate automatically through a wound spring 9, to actuate the striker 7 and thus sound the gong at successive intervals. As a means for restraining the member 8 from movement under normal conditions, a detent, indicated in general by the numeral 10, is provided within the casing 1 and this detent comprises a rocker mounted upon a suitable bracket 11 and comprising a member 12 which projects in the path of the member 8 and is normally engaged by the said member whereby the member 8 will be restrained against movement, the rocker further comprising a member 13 which extends substantially at right angles to the member 12, the pivot for the rocker being located substantially at the juncture of the two members 12 and 13 as clearly shown in Figure 2. At this point it will be observed that the arrangement of the parts is such that when the rocker 10 is swung about its pivot, the member 12 will be moved out of engagement with the member 8 thereby permitting the striking mechanism 6 to operate to actuate the striker 7 and sound the gong 5. A small plate 14 is secured upon a partition wall 15 within the casing 4 and is provided with an opening indicated by the numeral 16. A plunger, indicated in general by the numeral 17, is slidably fitted through the opening 16 and has a rounded end 18 which serves a purpose to be presently explained, the plunger being provided with a stem 19 which engages slidably through an opening in the bracket 11 and rests against the member 13 of the rocker 10. A spring 20 is disposed upon the stem 19 and bears at one end against the bracket 11 and at its other end against a collar 21 which is provided upon the plunger between its main portion and its said stem 19. The spring 20 normally holds the plunger retracted but it will be evident that when pressure is exerted against the rounded end 18 of the plunger, the plunger will be moved forwardly against the tension of the spring 20 thereby causing the end of its stem 19 to press against the member 13 of the rocker 10 and move the rocker about its pivot to release the member 8 of the striking mechanism.

Arranged within the casing 4 upon the rear wall thereof is a frame member comprising a base 22 having a plurality of forwardly projecting tongues 23 which constitute supports for the terminals of Bowden wires as will be presently explained. The base 22 likewise supports a stub shaft indicated by the numeral 24, and a pulley 25 is rotatably mounted upon this stub shaft and is provided with a plurality of peripheral grooves indicated by the numeral 26. The tongues 23 of the frame 22 serve as anchoring means for the sheaths 27 of the Bowden wires referred to above, the wires within the sheaths being indicated by the numeral 28 and being passed about the pulley 25 in the grooves 26 and anchored at their extremities. It will be evident at this point that a pull exerted upon any one of the various wires which may be connected to the pulley will result in rotation of the pulley. In order that such rotation of the pulley may effect movement of the plunger 17 and thus actuate the detent 10 to release the striking mechanism of the alarm device, an arm 29 is fixed with relation to the pulley 25 for rotation therewith and supports at its free end an arcuate cam head 30 the cam face 31 of which is designed to ride past the rounded end 18 of the plunger 17. By reference to Figures 2 and 3 of the drawings it will be observed that rotation of the pulley 25 through a portion of a cycle will result in the cam head 30 being moved past the said end 18 of the plunger 17 with the result that the cam face 31 will exert forward pressure against the plunger and thus move the plunger against the tension of the spring 20 to actuate the detent 10 and release the striking mechanism of the alarm. The manually operable and thermostatic control units heretofore referred to and which will now be described, constitute means for imparting rotary motion to the pulley 25 through the medium of the wires 28 of the Bowden wire connections and the said Bowden wire connections therefore constitute a medium whereby energy may be transmitted from a remote point to the striking mechanism of the alarm, in a purely mechanical way, to release this mechanism for operation.

Figures 4 and 5 of the drawings illustrate in detail one of the manually operable controls of the system and the control mechanism is preferably mounted in a casing 32 which is provided with a glass front 33 which may be broken in order to gain access to the operating means of the control. The said control comprises a frame 34 which corresponds in a general way to the frame 22 and which is provided with forwardly projecting tongues 35 which are preferably arranged in pairs at the upper and lower sides of the frame and at each side of the frame. These tongues constitute supports for the Bowden wires heretofore described and which are here indicated by the numeral 36, the wires being connected to a pulley 37 which is rotatably mounted upon a shaft 38 supported by the frame 34. The pulley 37 is provided with peripheral grooves 39 corresponding to the grooves 26 in the pulley 25, and the Bowden wires are connected to the said pulley within the grooves and extend partly about the pulley. A crank handle 40 is mounted upon the shaft 38 and secured to the pulley by a screw or other fastening means indicated by the numeral 41, the crank handle being provided at its outer end with a hand grip member 42 which may be grasped for the purpose of imparting rotary motion to the pulley 37. The entire control apparatus is mounted within the casing 32 and in order to gain access thereto it will be necessary to break the pane 33 which constitutes the front of the casing. Upon this being done the crank handle 42 may be grasped and rotated for the purpose of imparting rotary motion to the pulley 37 to thereby exert a pull upon the Bowden wires, which wires, it will be understood, extend to the pulley 25 of the alarm device 1.

By reference to Figure 1 of the drawings it will be observed that one or more of the signal or alarm devices may be employed and that the manually operable controls 2 may be of any desired number and arranged at suitable points upon the walls of the building in which the alarm system is installed. Where the system is to constitute a fire alarm, it will be found expedient to employ therein thermostatic controls such, for example, as the controls 3, one of these controls being preferably installed in juxtaposition to each of the manually operable controls. One of the thermostatic controls is clearly illustrated in detail in Figures 6, 7 and 8 of the drawings and the same comprises a casing indicated by the numeral 43. This type of control comprises a pulley 45 which corresponds to the pulleys previously described and is provided with peripheral grooves 46 in which the end portions of the Bowden wires 47 are laid and terminally secured. The pulley 46 is rotatably mounted upon a stub shaft 48, and the Bowden wires 47 are led from the pulleys of the manually operable controls or to the alarm devices depending upon the arrangement of the said alarm devices and the various controls throughout the system, and it will therefore be evident that upon rotation of the pulley 45 of any one of the thermostatic controls, the Bowden wires connected thereto will be taken up and the pull exerted thereon will be communicated to the alarm device or devices to trip the striking mechanism and actuate the alarm.

A collar 49 is fixed with relation to the pulley 45, and an arm 50 extends from this collar and is provided at its outer end with a stud 51 which projects through a slot 52 formed in the front wall 53 of the casing 43, the said slot being arcuate and concentric to the axis of the shaft 48. A knob base 54 is secured by means of screws 54' to the end of the stud 51 and is provided with a rounded end 55, a knob 56 being provided upon the said base so that in resetting the device the knob may be grasped and the pulley manually rotated. The rounded end 55 of the portion 54 of the arm 50 engages in a yoke 57 which is pivotally mounted, as at 58, upon the said partition wall 53, the yoke having, at the other side of its pivot, a short arm extension 59 which is provided with a hooked stud 60 engaging in an opening 61 in one link 62 of a thermostatic link connection, the other link of the connection being indicated by the numeral 63 and the two links being united by a bond 64 of readily fusible metal or alloy. The said link 63 is connected at its outer end to a hooked stud 65 which is mounted upon the partition wall 53 and it will be understood at this point that so long as the links 62 and 63 are connected by the bond 64, the yoke 57 will be held stationary and will constitute an abutment for the end of the arm 50 thus preventing any movement of the said arm. The collar 49 is provided with a short arm 66 to which is connected one end of a spring 67, the other end of the spring being connected to a bracket 68 fixed upon one of a number of tongues 69 which are provided upon the rear wall 70 of the casing 43. These tongues, as in the case of the tongues within the casing of the manual control shown in Figures 4 and 5 of the drawings, constitute supports for the ends of the Bowden wire sheaths which are in this instance indicated by the numeral 47, the Bowden wires being led into the casing 43 and secured at their extremities to the pulley 45, as previously explained. It will be evident that the spring 67 tends to rotate the arm 50 but that such movement of the arm is normally prevented by the engagement of its end 55 with the yoke 57. However, in the event of fire in the vicinity of the thermostatic control, the bond between the links 62 and 63 will be fused and the arm 50 will be released for such movement. The collar 49 being loosely mounted upon the shaft 48, and the pulley 45 being similarly mounted upon the said shaft, the pulley is, of course, free to rotate in one direction independently of the said collar and the arm 50 thereon. However, the pulley is provided with an abutment pin or stud 71 which engages against the upper side of the arm 50 when the arm is in normal position as shown in Figure 6 of the drawings. Of course when the arm is released for actuation by the spring 67, the swinging movement of the arm will effect rotation of the pulley 45 due to the engagement of the arm against the said abutment pin or stud 71. The knob 56 provides convenient means whereby the arm may be returned to its normal position and the unit reset at the time of insertion of a new thermostatic link.

In Figure 9 of the drawings there is illustrated a pulley which is particularly adapted for use where the Bowden wires are required to be led about corners or similar projections, or in fact in any place where it is found necessary to more or less abruptly turn the wire to follow a new direction. This form of pulley comprises a body 72 provided axially with an opening 73 of cylindrical form and housing a ball race 74 between which and a similar race 75 fitted upon the shaft 76, are interposed bearing balls 77. By providing these antifriction elements, the pulley is adapted to rotate freely and thus little exertion is required to effect movement of the Bowden wires associated therewith and leading from or to one or another of the manual or thermostatic controls. A cap ring 78 is secured in a recess in the outer face of the pulley 72 and serves to retain the ball races 74 and 75 in place as well as to prevent other disarrangements of the parts of the structure.

Figure 10 of the drawing illustrates a similar form of pulley except that in this instance the ring 78 is replaced by a cap disc 79 which is peripherally secured to the face of the pulley and is provided axially with a short stub shaft extension 80 to take the place of the shafts of the several controls heretofore described.

While I have herein described the use of Bowden wires in establishing connection between the control units and the alarm units, it will be understood that I am not limited to the use of this particular material as some other form of connection might be provided with equally as good result.

A disadvantage which attends the use of electrically controlled alarm systems and in fact all control systems so far as I am aware, prior to my invention, is that after the system has been once set in operation, the operation cannot be arrested until this is brought about automatically by some mechanism in the system. Furthermore, in such systems considerable difficulty and annoyance is often experienced and time consumed in resetting the system after it has been put in operation. The mechanical control embodying the present invention, however, presents the advantage that the operation of the system may be immediately arrested and the system may, if desired, be operated at intervals, through the mechanical control, if this should become necessary. This is of special advantage where the system is employed in schools or other similar institutions where fire drills are held, inasmuch as the one in charge of the system may immediately arrest the operation thereof when the occasion for sounding the alarm no longer exists. That this can be accomplished is due to the fact that the control wires of the various controls are led about opposite sides of the pulleys so that when any pulley is rotated in one direction the stretch of the control wire at one side of the pulley will be pulled upon while the stretch which passes about the diametrically opposite side of the pulley will be slackened, and this operation is, of course, reversed when the pulley is rotated in the opposite direction to either arrest the operation of the system or reset the various controls thereof.

In order that the manual control unit may be operated by an authorized person without the necessity of breaking the glass front 33 of the casing, as, for example, where it is necessary to occasionally have fire drills, the said pane 33 is preferably mounted in a door 33' hinged at one side of the body of the casing 32 and held closed at its opposite side by any suitable lock 33ᵃ.

In order that the link 63 of the thermostatic element of the thermostatic control may be prevented from assuming a position in the path of movement of the arm 50 at the time the bond between the links is fused, in the event of fire, one or more studs 63′ are provided or formed upon the partition wall 53 and are so located as to support the said link in the inclined position shown in Figure 6 of the drawings and prevent the link assuming a vertical position by gravity.

Having thus described the invention, what is claimed as new is:

1. In a mechanical control system, an alarm unit embodying operating mechanism including a trip element, a detent normally restraining the trip element, a rotatable pulley, means actuated through rotation of the pulley for displacing the detent to release the operating mechanism of the alarm unit for operation, a manually operable control unit embodying a pulley, and manually operable means for rotating the pulley last mentioned, and a flexible element extending from the alarm unit to the control unit and engaged about the pulleys of the two units.

2. In a mechanical control system, an alarm unit embodying operating mechanism including a trip element, a detent normally restraining the trip element, a pulley rotatably mounted in juxtaposition to the trip element, a plunger coacting with the detent, a cam rotatable with the pulley and having a working face arranged to ride against the plunger and longitudinally move the same to actuate the detent when the pulley is rotated, a manually operable control unit embodying a rotatable pulley, means whereby the pulley may be rotated, and a flexible mechanical connection extending from the control unit to the alarm unit and engaged about the said pulleys whereby rotation of the alarm unit pulley will be effected upon rotation of the manually operable control unit pulley.

3. In a mechanical control system, an alarm unit including a rotatable pulley, alarm mechanism, and means actuated through rotation of the pulley in one direction to release the alarm mechanism for actuation, and a control unit embodying a pulley, means for effecting rotation of the pulley, and control wires led about diametrically opposite sides of the respective pulleys and connected thereto whereby rotation of the control pulley in one direction will effect rotation of the pulley of the alarm in a direction to trip the alarm mechanism and rotation of the control pulley in the opposite direction will effect rotation of the pulley of the alarm mechanism to effect discontinuance of operation of the said mechanism.

4. In a mechanical control system, an alarm unit embodying operating mechanism including a trip element, a detent normally restraining the trip element, a rotatable pulley, means actuated through rotation of the pulley for displacing the detent to release the operating mechanism of the alarm unit for operation, a manually operable control unit embodying a pulley and manually operable means for rotating the pulley last mentioned, and a flexible element trained in opposite directions about the two pulleys and extending between the same whereby rotation of the pulley of the control unit in one direction will effect operation of the alarm unit and rotation of the said pulley of the control unit in the opposite direction will effect resetting of the mechanism of the alarm unit.

In testimony whereof I affix my signature.

ADOLPH C. BRUECKMANN. [L. S.]